United States Patent [19]
Sridhar et al.

[11] Patent Number: 5,799,064
[45] Date of Patent: Aug. 25, 1998

[54] APPARATUS AND METHOD FOR INTERFACING BETWEEN A COMMUNICATIONS CHANNEL AND A PROCESSOR FOR DATA TRANSMISSION AND RECEPTION

[75] Inventors: Manickam R. Sridhar, Holliston; Minh Hoang, Stoughton; John Wortman, Jr., West Roxbury, all of Mass.

[73] Assignee: Motorola, Inc., Schaumburg, Ill.

[21] Appl. No.: 521,717

[22] Filed: Aug. 31, 1995

[51] Int. Cl.⁶ .................................................. H04M 11/00
[52] U.S. Cl. ........................... 379/98; 379/93; 375/222
[58] Field of Search ............................... 379/98, 93, 96, 379/97; 375/222, 377

[56] References Cited

U.S. PATENT DOCUMENTS

| | | |
|---|---|---|
| 4,965,641 | 10/1990 | Blackwell et al. . |
| 5,170,470 | 12/1992 | Pindar et al. . |
| 5,367,534 | 11/1994 | Chou et al. ............ 375/222 |

*Primary Examiner*—Stella Woo
*Attorney, Agent, or Firm*—Nancy R. Gamburd; Peter M. Dichiara

[57] ABSTRACT

An apparatus (101) and method for interfacing between a processor (103) and a communications channel (105), the processor operable in data terminal equipment (102) such as a computer having a communications application program, to provide for data transmission and reception over a communications channel (105), utilizing the computer processor without additional or redundant microprocessor or digital signal processor components. The apparatus and method provide for data transfer between the interface apparatus (101) and the communications channel (105) at a first, determinate frequency corresponding to a specific data transmission rate. The apparatus and method provide for data transfer between the interface apparatus (101) and the processor (103) at a second, indeterminate frequency, and provides for interim data storage in memory (115) between data transmission (or data reception) and data processing, such as modulation and demodulation, by the computer processor (103). The apparatus and method further provide for generating an interrupt signal to the processor to indicate the presence of received data for processing and the absence of digital data for transmission.

43 Claims, 5 Drawing Sheets

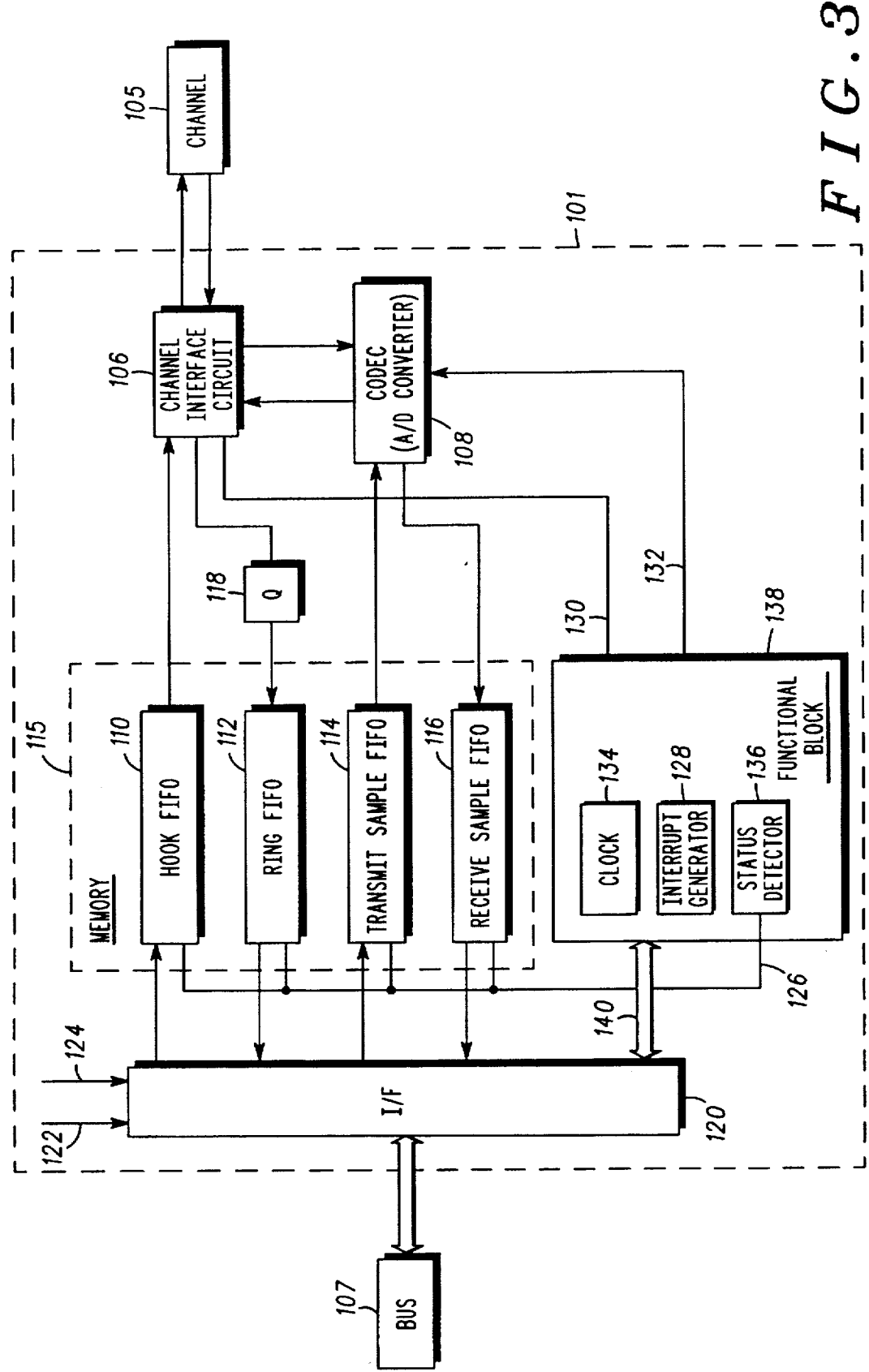

APPARATUS AND METHOD FOR INTERFACING BETWEEN A COMMUNICATIONS CHANNEL AND A PROCESSOR FOR DATA TRANSMISSION AND RECEPTION

FIELD OF THE INVENTION

The invention relates in general to data communications devices, and more particularly, to a method and apparatus for interfacing between a processor and a communications channel for data transmission and reception.

BACKGROUND OF THE INVENTION

Programmable, processor-controlled data terminal equipment ("DTEs"), such as personal computers, workstations, and data terminals, are increasingly common throughout schools, work places, and society in general. In addition, processor capability has been increasing significantly, with increasingly faster and more powerful processors being utilized in computers, such as the PowerPC™ processor from Motorola and the Pentium™ processor from Intel. These processors may be programmed to perform a variety of functions.

Data communications devices ("DCDs") such as analog and digital modems, terminal adapters, and computer networking devices, generally have been utilized for data transfer between various DTEs over communications channels, such as the Public Switched Telephone Network ("PSTN") or Integrated Services Digital Network ("ISDN"). Such DCDs have typically been separate devices, such as desktop modems, rack-mounted modems, PCMCIA cards, or separate circuit boards utilized within a computer housing. In the prior art, moreover, such DCDs also typically contain several processors, such as a digital signal processor ("DSP") and a microprocessor, or a unitary processor combining the functions of both the DSP and the microprocessor. DCDs have tended to require separate processing capability because DCDs are computationally and mathematically intensive, performing such functions as modulation, demodulation, coding, decoding, data compression, error correction, precoding, equalization, interfacing with the DTE, and other control functions. In addition, DCDs have been performing at ever faster transmission rates, such as 28.8 kbps available under the V.34 standard, and with data compression and error correction protocols available under the V.42 and V.42 bis standards. Such computationally intensive processing would tend to require more processor capability and more processing time than is generally available or desirable from a more general, multipurpose processor utilized in a DTE.

With the advent of increasing processor capability in DTEs, such as that available in the PowerPC® and Pentium® processors, the additional processing capability available in DCDs may no longer be necessary and may be redundant. Provided that such processing capability is available, it may be more cost effective and efficient to provide for a single processor, with appropriate hardware and software, capable of performing both the functions of the various computer applications programs, such as word processing, mathematical computations and graphics, and the functions of a DCD, such as modulation, demodulation, and data compression. Such a combined processor-modem arrangement was disclosed in Blackwell et al. U.S. Pat. No. 4,965,641, "Processor Modem", issued Oct. 23, 1990, and incorporated by reference herein.

With the increasing data transmission rates and other complex functions now required for DCDs which are to be compatible with the V.34 and V.42 bis protocols, implementations of a processor modem may be complicated or difficult and may have increasing and potentially incompatible performance requirements. For example, a difficulty with the implementation of a processor modem is related to the high processing speeds available with the new, general purpose computer processors, which are capable of processing data for transmission at much faster rates than are typically available for actual data transmission over a channel. For example, the computer processor may be able to process data at rates in the megahertz or gigahertz range, which are several orders of magnitude greater than typical data transmission rates, such as 28.8 kbps for V.34 or 64 kbps for ISDN. Correspondingly, data may be arriving from a communications channel continually, at a specific and predetermined data transmission rate, which is typically much slower than the processing rate of the computer processor, and which may not effectively utilize the entire processing capability of the computer processor. For example, it would be an inefficient use of computer processor capability to have the processor waiting to receive data at 28.8 or 14.4 kbps, when the processor could be performing other application functions simultaneously. This mismatch or interface problem between data transmission rates and data processing rates tends to create a "bottleneck" problem, with either too much data available from the processor for transmission (given the data transmission rate), or too little data available from the channel for subsequent processing (given the computer processing capability).

In addition, while the processor is performing other applications functions, the processor may also need to be periodically or continually responding to various requirements of data transmission protocols, such as transmitting acknowledgement signals upon receipt of data packets or frames. A need has remained, therefore, for a more efficient apparatus and method to interface with the general purpose computer processor and transmit and receive data over a communications channel, to provide for both efficient data transfer and efficient use of processor capability.

BRIEF DESCRIPTION OF THE DRAWINGS

FIG. 3 is a detailed block diagram illustrating a preferred embodiment of an apparatus in accordance with the present invention.

DETAILED DESCRIPTION OF THE INVENTION

Figure 1:
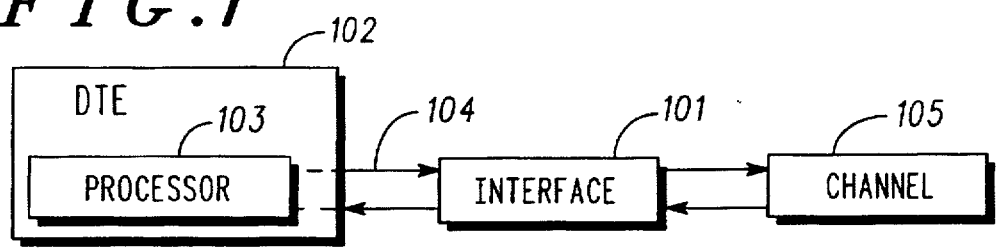
FIG. 1 is an overall block diagram illustrating a first embodiment of an apparatus in accordance with the present invention.

As mentioned above, a significant difficulty which may be encountered in an actual implementation of a processor modem having a modem software application, concerns the differing rates or frequencies of data transmission compared to computer processing rates or frequencies. These differing rates or frequencies may create a bottleneck-type problem which may not effectively utilize or optimize the available computer processing capability, with either too much data available from the processor for transmission (given the data transmission rate), or too little data available from the channel for subsequent processing (given the processing capability). In the prior art, this problem did not arise, because at least one dedicated processor (in the DCD) processed incoming data, to directly create a complete file in memory in or accessible to the DTE, for subsequent processing by the second, dedicated computer processor. Now, the apparatus and method of the present invention addresses this incompatibility issue when one processor is to perform both functions, simultaneously and in real time.

Secondly, as discussed in more detail below, the interface apparatus and method in accordance with the invention addresses and interfaces both the deterministic aspects of data transmission, and the more indeterminate aspects of computer processing, in order to simultaneously optimize the data transmission functions and other application functions of the computer processor. For example, data transmission protocols, such as V.34 and V.32 bis, typically require specific and determinate transmission rates, with very deterministic sampling rates, to provide an accurate representation of the transmitted or received signal. Conversely, a computer processor may be simultaneously operating several programs or functions, and each may have different processing requirements, resulting in the processor periodically working with each program at a more indeterminate frequency, such as at a frequency needed or specified by the user.

Third, the apparatus and method of the invention provides the means for the computer to address data transmission or network protocol requirements, while simultaneously performing other functions. Fourth, the apparatus and method provide several mechanisms for recovery from various processor or computer problems. Lastly, as discussed in more detail below, the apparatus and method of the invention provides the basis for addressing any latency in processor response time which may occur as a result of either the operating system or the simultaneous operation of several programs or functions. For example, the apparatus and method of the invention generates an interrupt signal to the processor to indicate either or both the presence of incoming data for processing or the absence of outgoing data for transmission. Depending upon how quickly the processor may or may not respond to an interrupt request from an external device or card, such as a read/write request to read into the processor the incoming data for processing and write out to the invention outgoing data for transmission, the apparatus and method provides a mechanism to avoid data underruns, from insufficient data available for transmission, and to avoid data overruns, from excess data available for processing.

Referring to FIG. 1, FIG. 1 is an overall block diagram illustrating a first embodiment of an interface apparatus 101 in accordance with the present invention. FIG. 1 illustrates a DTE 102, such as a personal computer, a file server, or a workstation, containing a processor 103, such as a PowerPC® or Pentium® processor. The processor, through lines, cable or bus 104, is connected to the interface apparatus 101, which is further connected to a communications channel (or "channel") 105 for data transmission and reception. The lines, cable or bus 104 may be any type of arrangement appropriate for connection to a computer, such as an ISA or PCI bus or a PCMCIA standard compatible slot. The interface apparatus 101 is discussed in detail below with reference to FIGS. 3 and 4, and performs such functions, typically found in a modem, of ring detection, pulse and tone dialing, and analog-digital conversion. The processor 103, containing or operating under a communications application program, such as a modem application program, typically performs other modem functions such as training, equalization, scrambling, encoding, decoding, echo cancellation, and precoding. Utilizing the interface apparatus 101 for interfacing to the communications channel 105, the processor 103 may contain or operate under other communications applications programs, such as telephone answering, and voice or speech recognition or processing. If coupled to a digital communications channel such as ISDN, the processor 103 may contain or operate under other communications applications programs, such as one for a terminal adapter.

Figure 2:
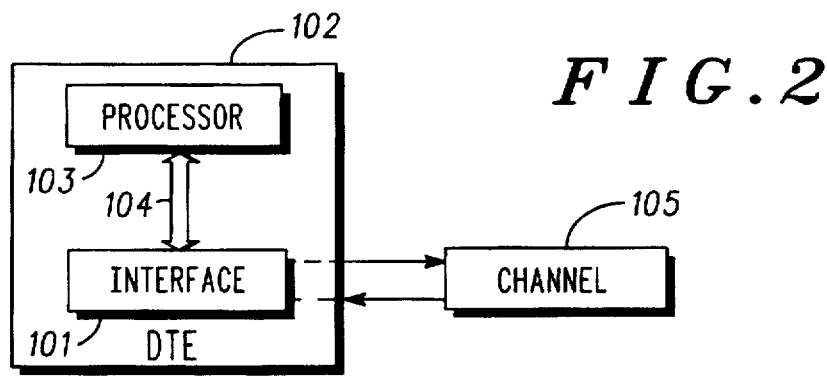
FIG. 2 is an overall block diagram illustrating a second embodiment of an apparatus in accordance with the present invention.

FIG. 2 is an overall block diagram illustrating a second embodiment of an apparatus in accordance with the present invention. As shown in FIG. 2, the interface apparatus 101, in accordance with the present invention, has been incorporated within the DTE 102. For example, the interface apparatus 101 may be embodied as a circuit board, an ISA card, a PCMCIA card, or an integrated circuit. As in FIG. 1, the interface apparatus 101 is also connected or coupled to the processor 103 of the DTE 102, using any appropriate arrangement, such as an ISA bus, PCI bus, or PCMCIA slot. Continuing to refer to FIG. 2, the interface apparatus 101 is also further connected to the communications channel 105 for data transmission and reception. Similarly to FIG. 1, the interface apparatus 101 (also discussed in detail below with reference to FIGS. 3 and 4) performs such functions, typically found in a modem, of ring detection, pulse and tone dialing, and analog-digital conversion. Similarly, the processor 103, containing or operating under a communications application program, such as a modem application program, typically performs other modem functions such as training, equalization, scrambling, encoding, decoding, echo cancellation, and precoding.

FIG. 3 is a detailed block diagram illustrating a preferred embodiment of an interface apparatus 101 in accordance with the present invention. As shown in FIG. 3, an interface apparatus 101 is coupled to or connected within a DTE 102, such as a computer, via bus 107, such as an ISA or PCI bus, and coupled to a communications channel 105, for data transmission and reception. Within the interface apparatus 101, a channel interface circuit 106 receives a data signal transmitted on the channel 105, such as the PSTN. The channel interface circuit 106 may be, for example, a data access arrangement known as a "DAA", which are known in the prior art and may be made of a variety of discrete components, including analog multiplexers, resistors, capacitors, hybrid circuitry, and operational amplifiers, or may be embodied in whole or part as an integrated circuit, and performs such functions as impedance matching, power level adjustment, and interconverting four to two wire connections. Use of a DAA for the channel interface circuit 106 would be appropriate for connection to an analog line, such as a telephone line, and in that event, the data signal transmitted on and received from the channel would be an analog signal. As discussed with reference to FIG. 4, the channel interface circuit 106 also may be other devices, such as digital interface circuits, suitable for connection to digital lines or channels, including S/T interfaces and U interfaces used for connection to digital services such as ISDN, and which perform such functions as digital data formatting. In that event, the data signal transmitted on and received from the channel would be a digital signal. Typically connected to the channel interface circuit 106 is coder-decoder ("codec") 108 or, equivalently, an analog-to-digital and digital-to-analog converter, referred to herein as an analog-digital ("A/D") converter (such as an SGS Thompson ST 7544 or ST 7545). The codec (or A/D converter) 108 samples and converts a data signal (such as an analog signal) received from the channel 105 (via the channel interface circuit 106) to digital form, and converts digital information to a data signal (such as an analog signal) for transmission over the channel 105. Because of the interchangeability or equivalence of an A/D converter and a codec in the invention, reference to either a codec or an A/D converter should be understood to mean and include the other.

Continuing to refer to FIG. 3, the interface apparatus 101 includes a memory 115 illustrated, in the preferred embodiment, as hook FIFO (first in, first out) 110, ring FIFO 112, transmit sample FIFO 114, and receive sample FIFO 116. The memory 115 may be embodied in any form, such as random access memory, and is shown as having separate FIFOs in FIG. 3 for ease of illustration only. In addition, the memory may have formats other than the illustrated first in, first out memory, provided that the memory has a capacity to maintain the stored data in an ordered or sequential manner, such as in the form of a sequence of digital data. The ring FIFO 112 portion of memory is also coupled to a one bit quantizer 118, which is coupled to the channel interface circuit 106, while the hook FIFO is shown directly connected to the channel interface circuit 106. The transmit sample FIFO 114 and receive sample FIFO 116 are also coupled to the codec (or AID converter) 108. Each of the FIFO memory circuits is connected to an electromechanical (or optical) interface 120, such as an ISA, PCI or PCMCIA interface, which typically includes a feature, line or connection 122 for address selection and a feature, line or connection 124 for IRO selection, for proper functioning within the DTE 102. The electromechanical interface 120, such as an ISA interface, PCI interface, or PCMCIA interface, is connected to the bus 107, such as a corresponding ISA, PCI or PCMCIA bus, for connection to a processor, such as processor 103 in DTE 102 in FIGS. 1 and 2. Each of the FIFO memory circuits is also coupled via status line (or bus) 126 to functional block 138, for status monitoring. The functional block 138 contains a clock signal generator (also referred to as a clock or clocking or timing circuitry) 134, an interrupt generator 128, and a status detector 136. These various clock, interrupt and status features may also be implemented as separate or as integrated components, may be combined within other functional blocks, and are included within a functional block 138 for ease of illustration only. The clock signal generator 134, interrupt generator 128, and status detector 136, as contained within functional block 138, are also coupled to the codec (or A/D converter) 108 via line 132, to the channel interface circuit 106 via line 130, and to the electromechanical interface 120 via line (or bus) 140.

The clock signal generator (or clock) 134 may also be contained within the processor 103. The clock signal generator 134 is needed to generate a stable clock signal for the codec (or AND converter) 108, so that the codec (or AID converter) 108 may sample an incoming data signal at regular, definite, determinate or otherwise predetermined intervals, referred to as a first or determinate frequency, to obtain an accurate representation of the received signal consisting of a continuous stream of digital values, and to accurately form an outgoing data signal (such as an analog signal) for transmission from a continuous stream of digital values.

Continuing to refer to FIG. 3, the interface apparatus 101 functions to receive an incoming signal (such as a data signal) through the channel interface circuit 106, which is sampled and converted to digital form by the codec (or A/D converter) 108 at a first or determinate frequency, and to transmit an outgoing signal (such as a data signal) on the channel 105 generated by the codec (or A/D converter) 108 from digital data, also at a first or determinate frequency. The samples of the received signal are transferred to and stored in the receive sample FIFO 116. As monitored by the status detector 136 via status line (or bus) 126, when a sufficient or predetermined number of samples have been transferred and stored in the receive sample FIFO 116, the interrupt generator 128 generates an interrupt signal (or first interrupt signal) to the processor 103, which is transmitted to the processor 103 via the electromechanical interface 120 and the bus 107. The first interrupt signal, or any other equivalent signal, serves to indicate to the processor 103, as programmed or incorporated within the communications application program and/or the operating system, that the processor 103 should read, into processor memory, the samples held in the receive sample FIFO 116, within a predetermined period of time. In response to the first interrupt signal, the processor 103 is programmed to acknowledge the first interrupt signal, and to read the samples into processor memory from the receive sample FIFO 116. The receive sample FIFO 116 has then been emptied, and may be refilled by new incoming data from the codec (or A/D converter) 108. If the memory is embodied in a different form which is not a FIFO, then the information stored in the memory may be written over or otherwise revised by the new incoming data.

Simultaneously during the same interrupt cycle (i.e., in response to the same, first interrupt signal), the processor may write digital data into the transmit sample FIFO 114, transmitted via the electromechanical interface 120. The digital data from the processor is stored in the transmit sample FIFO 114 for conversion into an outgoing data signal (such as an analog signal) by the codec (or A/D converter) 108, at a first or determinate frequency, for data transmission. As the codec (or A/D converter) 108 generates an outgoing data signal from the digital data stored in the transmit sample FIFO, the transmit sample FIFO is emptied, and may be refilled during the next interrupt cycle by the processor. Alternatively, the sequence of steps of writing and storing digital data and forming an outgoing data signal may be in response to a second interrupt signal, which may or may not have the same form as or be identical to the first interrupt signal. For example, in various embodiments, it may be desirable to control the data transmission process separately and independently from the data reception process, in which case the second interrupt signal should be distinguishable in some manner from the first interrupt signal.

In the preferred embodiment, the transmit sample FIFO 114 and the receive sample FIFO 116 each have a capacity to store at least 18 samples, determined on the basis of a V.32 bis symbol rate of 2400 Hz, a sampling clock of 7200 Hz for three samples per symbol, at a rate of six symbols per interrupt (or interrupt cycle), resulting in eighteen samples per interrupt. The interrupt rate is then below 1 kHz at 400 Hz. Each of these various parameters may be modified depending upon the symbol rate, the sampling rate, the desired data transmission protocol or standard (such as V.32, V.32 bis, or V.34), any desired interrupt rate, and any desired implementation (such as in ASICs). In addition, memory storage capacity may be increased or decreased depending upon the desired level of protection against potential data overrun and data underrun conditions. For example, a longer interval between interrupt signals would tend to require transmit and receive memory circuits having a greater capacity than 18 samples, to avoid data overrun and underrun conditions. In the preferred embodiment, the transmit sample FIFO 114 and the receive sample FIFO 116 each have a capacity to store 32 samples, to avoid data overruns (if the processor does not respond quickly enough to the interrupt signal and incoming data continues to accumulate), and to avoid data underruns (if the processor does not respond quickly enough to the interrupt signal and outgoing data begins to be depleted).

The preferred embodiment of the present invention also incorporates various safeguards or recovery mechanisms to counteract situations or problems which may be encountered due to the use of a processor or computer for data transmission or reception. For example, occasionally various programs within a computer interfere with each other, causing communications system failure or computer system failure such as, for example, causing the computer to become nonresponsive to external stimuli such as the keyboard or mouse, or causing the computer to have a general protection fault, "crash" or seize, and may require resetting or rebooting of the operating system. (As used herein, "communications system" is the combination of the processor (or computer) operating with or under a communications program, in conjunction with the interface apparatus, and may be considered a part or subset of an overall computer or processor system). In the event of any such communications system failure or other "catastrophic" occurrence, in the preferred embodiment, the status detector 136 monitors the status of the transmit sample FIFO 114 and the receive sample FIFO 116, via status line 126, to determine whether the processor 103 has responded to interrupt signals and has read from the receive sample FIFO 116 and/or has written to the transmit sample FIFO 114 within a predetermined period of time. If the status detector 136 has determined or detected that there has not been any such activity for a predetermined period of time, such as for three seconds, the status detector 136 determines that a communications system failure has occurred and generates a status signal on line 130 to the channel interface circuit 106, the status signal indicating that the channel interface circuit 106 should drop the line and terminate the communication, e.g., to cause a relay to open, go on hook, and drop the line or call.

Also utilizing the status line 126, in the preferred embodiment, the status detector 136 also determines whether a data overrun condition may exist in the receive sample FIFO 116 and whether a data underrun condition may exist in the transmit sample FIFO 114. If such data underrun conditions, data overrun conditions, or other data error conditions (individually and collectively referred to as a "data capacity condition") exist, or these data capacity conditions persist for a predetermined period of time or exceed a predetermined threshold, the status detector 136 will generate a status signal to indicate an error condition, to reset the receive sample FIFO 116 and the transmit sample FIFO 114, and to retrain the communications system (e.g., the communications system being the interface apparatus 101 operating in conjunction with a DTE 102 having a communication program, such as a modem application program). Such resetting and retraining of the communications system may be needed when utilizing a coherent data modulation process because, for example, of the loss of proper sequence and synchronization under data underrun conditions or the potential loss of data under data overrun conditions. In the preferred embodiment, the status detector 136 causes the resetting and retraining, and does so without loss of communication, such as without dropping the communication line.

Continuing to refer to FIG. 3, the ring FIFO 112 and one bit quantizer 118 are utilized in the detection of an incoming ring signal for data reception. A typical ring signal may have a frequency, for example, between 20 and 60 Hz, with a particular cadence (on and off sequence), and a fairly high voltage. For an incoming ring signal, the one bit quantizer 118 samples the signal at a rate of 1 kHz in the preferred embodiment, and generates a digital 1 (one) if the incoming signal has a value greater than a predetermined threshold, such as 30 V in the preferred embodiment, and generates a digital 0 (zero) if the incoming signal has a value less than or equal to the predetermined threshold. The one bit quantizer 118 generates a stream of bits, which are transferred to and stored in the ring FIFO 112 portion of memory 115. In the preferred embodiment, the ring FIFO 112 has a capacity of 32 bits, for storing 32 msec of information. When the ring FIFO 112 has reached a predetermined capacity, such as 32 bits, a status signal is generated from the ring FIFO 112 to the interrupt generator 128 via status line 126. Alternatively, the status detector 136 may otherwise monitor the status of the ring FIFO 112 at predetermined intervals, such as every 10 msec, and determines if the ring FIFO 112 has reached a predetermined capacity. When the ring FIFO 112 has reached a predetermined capacity, as determined by either a status signal or other status detection or monitoring, the interrupt generator 128 generates an interrupt signal which is transmitted to the processor 103 via the electromechanical interface 120 and the bus 107. The interrupt signal may be different from, the same as or similar to the first interrupt signal (and/or the second interrupt signal). Accordingly, depending upon the desired implementation, the interrupt signal indicative of the status of the ring FIFO 112 may be referred to as a first, second or third interrupt signal. The processor 103, using modem or other communications applications software, then processes the bit stream to detect a valid incoming ring signal. For example, a valid incoming ring signal should have a sequence of digital 1s, followed by a sequence of digital 0s, and so on, indicating the particular cadence and voltage of a valid incoming ring signal.

For outgoing dialing, the interface apparatus 101 may utilize dual tone multifrequency ("DTMF") or pulse dialing. For DTMF, the dialing may be accomplished by the transmission of the appropriate digital dialing information from the processor 103 to the transmit sample FIFO 114 for processing into an outgoing signal (such as an outgoing analog signal) by the codec or A/D converter 108. In the preferred embodiment, pulse dialing is accomplished by the transmission of appropriate digital information from the processor 103 to the hook FIFO 110, which information would indicate going off hook and contain the appropriate pulse dialing sequence. For example, a particular, predefined bit stream of digital 1s and 0s would indicate going off hook by opening and closing an appropriate relay in the channel interface circuit 106. Pulse dialing is accomplished by transmitting a particular sequence of predefined bits to indicate the desired dialing cadence, for example, 3 on hook/off hook sequences followed by quiet, followed by 2 on hook/off hook sequences. In typical pulse dialing, the relay is normally closed, resulting in a high voltage (logic one). In the preferred embodiment, the ring FIFO 110 will default to open, cutting off the call, if the processor has not written data into the ring FIFO 110 for more than 32 msec, to avoid chattering on the channel 105.

Continuing to refer to FIG. 3, depending upon the desired implementation, the electromechanical interface 120 will typically contain an IRQ select line or feature 124 and an address select line or feature 122, for proper interfacing to the host processor or computer. The address select line or feature 124 maps various addresses to items such as the transmit sample FIFO 114 and the receive sample FIFO 116. The IRQ select line or feature 122 provides a unique interrupt line to the processor or computer, to avoid potential conflict with other cards or boards. Both the address select feature 122 and the IRQ select feature 124 are typically accomplished through switches on the card or board interface.

Figure 4:
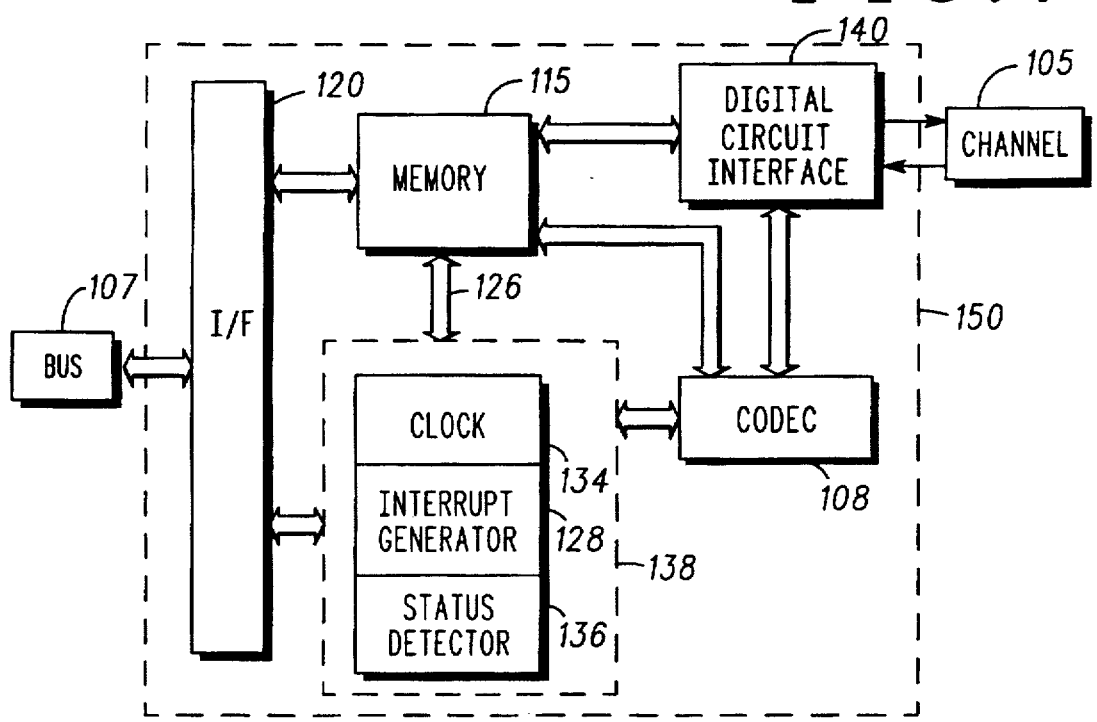
FIG. 4 is a block diagram illustrating an alternative embodiment of an interface apparatus, in accordance with the present invention, for interfacing with a digital network.

FIG. 4 is a block diagram illustrating another embodiment of an interface apparatus, in accordance with the present invention, for interfacing with a digital network. Functioning virtually identically to the interface apparatus 101 discussed above, rather than having a channel interface circuit 106 (such as a DAA) for interfacing with an analog network such as the PSTN, the interface apparatus 150 of FIG. 4 includes a digital interface circuit 140, such as an S/T interface or a U interface, for data transmission in digital form on a digital channel, such as ISDN. In this manner, the interface apparatus of the present invention may also operate as a terminal adapter or perform other communications functions over digital channels, in addition to communications functions over analog channels, such as operating as an analog or digital modem or as a telephone answering machine. Accordingly, as used herein, a channel interface circuit 106 should be understood to mean and refer to, and include within its scope, its various analog or digital embodiments or counterparts, such as a digital interface apparatus (for connection to a digital channel), such as an S/T or a U interface, or an analog interface apparatus, such as a DAA.

Figure 5:
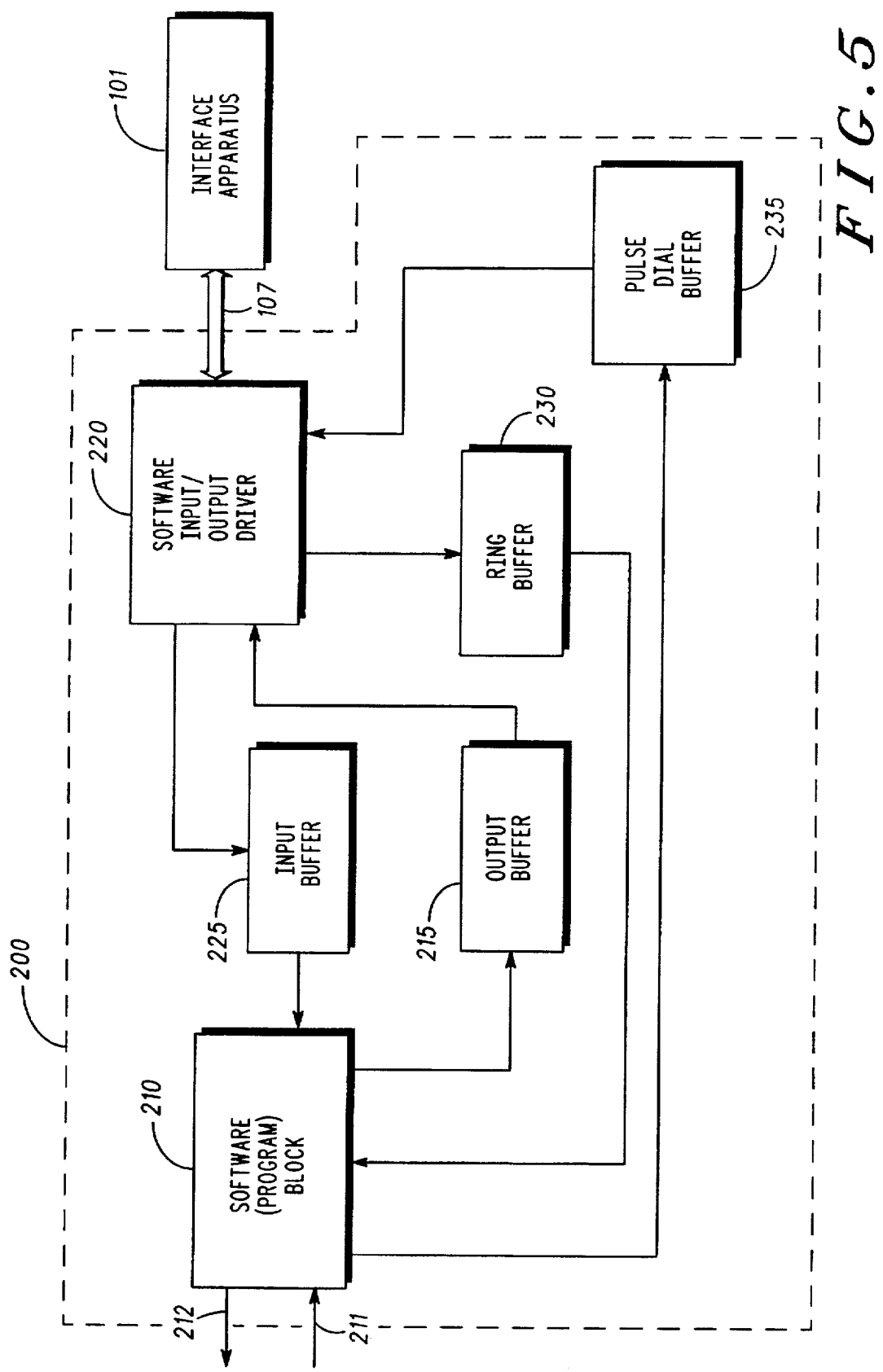
FIG. 5 is a detailed block diagram illustrating an interface apparatus in accordance with the invention coupled to a computer having a modem application software program.

FIG. 5 is a detailed block diagram illustrating an interface apparatus 101 in accordance with the invention coupled to a computer 200 having a modem or other communications application software program in block 210, for the purpose of illustrating computer or processor operations corresponding to operations of the interface apparatus 101. The modem or other communications application software block 210 receives digital data from a file in memory on the data-in line 211, in response to an interrupt signal which may indicate that data is needed for transmission, and performs various modem or communications functions such as precoding, data compression, filtering, interpolating, scrambling and encoding, converting the digital data into processed digital data having a form suitable for any additional processing by the codec or A/D converter 108. This processed digital data is transmitted to an output buffer 215. In the preferred embodiment, the software block 210, operating as modem software, would process six symbols of information, and the output buffer 215 correspondingly would also store 18 samples. The software input/output driver 220 then transfers the processed digital data to the bus 107 of the interface apparatus 101 for storage in the transmit sample FIFO 114 and for processing by the codec (or A/D converter) 108 and transmission on the channel 105.

Similarly, received, sampled digital data from receive sample FIFO 116 may also be processed by the computer 200 (or processor 103), in response to an interrupt signal indicating that incoming data is available for processing. The software input/output driver 220 obtains the received, sampled digital data from the receive sample FIFO 116, emptying the receive sample FIFO 116, and stores the received, sampled data for processing in the input buffer 225, for processing by the software block 210. In the preferred embodiment, the input buffer 225 also has the capacity to store 18 samples. The software block 210, operating as modem software, performs various modem functions on the received samples, such as echo cancellation, timing and carrier frequency offset equalization, other channel equalization, filtering, demodulation, decoding, and descrambling, to generate digital data output on the data-out line 212 to a file in memory. The software block 210 may also include V.42, V.42 bis or other data, video or multimedia protocol capability for data compression and error correction.

Continuing to refer to FIG. 5, ring detection and pulse dialing procedures may be correspondingly performed by the software block 210. From the ring FIFO 112, the software input/output driver 220 obtains the sampled data from the ring FIFO 112, and stores the data in the ring detection buffer 230 for processing by the software block 210. Data for pulse dialing is transferred from the software block 210 to the pulse dialing buffer 235, for transfer by the software input/output driver 220 to the hook FIFO 110.

In summary, FIGS. 3–5 disclose an apparatus for interfacing between a processor 103 and a communications channel 105 for data transmission and reception, the processor 103 operable in data terminal equipment 102 having a communications application program, such as a modem or terminal adapter application program. The interface apparatus 101 comprises, first, a channel interface circuit 106 coupleable to the communications channel 105 for reception of a data signal to form an incoming data signal and for transmission of a data signal from an outgoing data signal; second, a memory 115 coupled to the channel interface circuit 106 to store a plurality of sequences of digital data; third, a codec 108 coupled to the memory 115 and further coupled to the channel interface circuit 106 to periodically sample the incoming data signal at a first frequency (which is usually a determinate frequency) to form a sequence of incoming sampled data and to transfer the sequence of incoming sampled data to the memory 115, and to receive a sequence of outgoing digital data from the memory 115 and to convert the sequence of outgoing digital data to the outgoing data signal; fourth, an interrupt signal generator 128 coupled to the memory 115 to generate a first interrupt signal and to transmit the first interrupt signal to the processor 103; and fifth, an electromechanical interface circuit 120 coupled to the memory 115 and to the interrupt signal generator 128, the electromechanical interface circuit 120 further coupleable to the processor 103 for data transfer between the processor 103 and the memory 115 and for transmission of the first interrupt signal to the processor 103. The interrupt signal generator 128 may also be further responsive to generate the first interrupt signal to indicate a presence of a first predetermined quantity of digital data for processing, and/or to indicate an absence of a second predetermined quantity of digital data for transmission. The interrupt signal generator 128 may also be further responsive to generate a second interrupt signal (which may or may not be identical to the first interrupt signal) to indicate a presence of an incoming ring signal, in which case the electromechanical interface circuit is further coupled to the processor for transmission of the second interrupt signal to the processor. The various first and second interrupt signals are typically generated at a second frequency, which is usually an indeterminate or variable frequency.

The preferred embodiment may also include a status detector 136 coupled to the memory 115 and to the interrupt signal generator 128, further coupled to the channel interface circuit 106, the status detector responsive to detect a data capacity condition in the memory 115, and in response to the detection of a data capacity condition in the memory 115, the status detector 136 generates a status signal to reset the memory 115 and to institute retraining procedures for the communications system. The status detector 136 may also be responsive to detect a communications system failure, and upon such detection, responsive to generate a status signal to terminate a connection with the communications channel 105.

Figure 6:
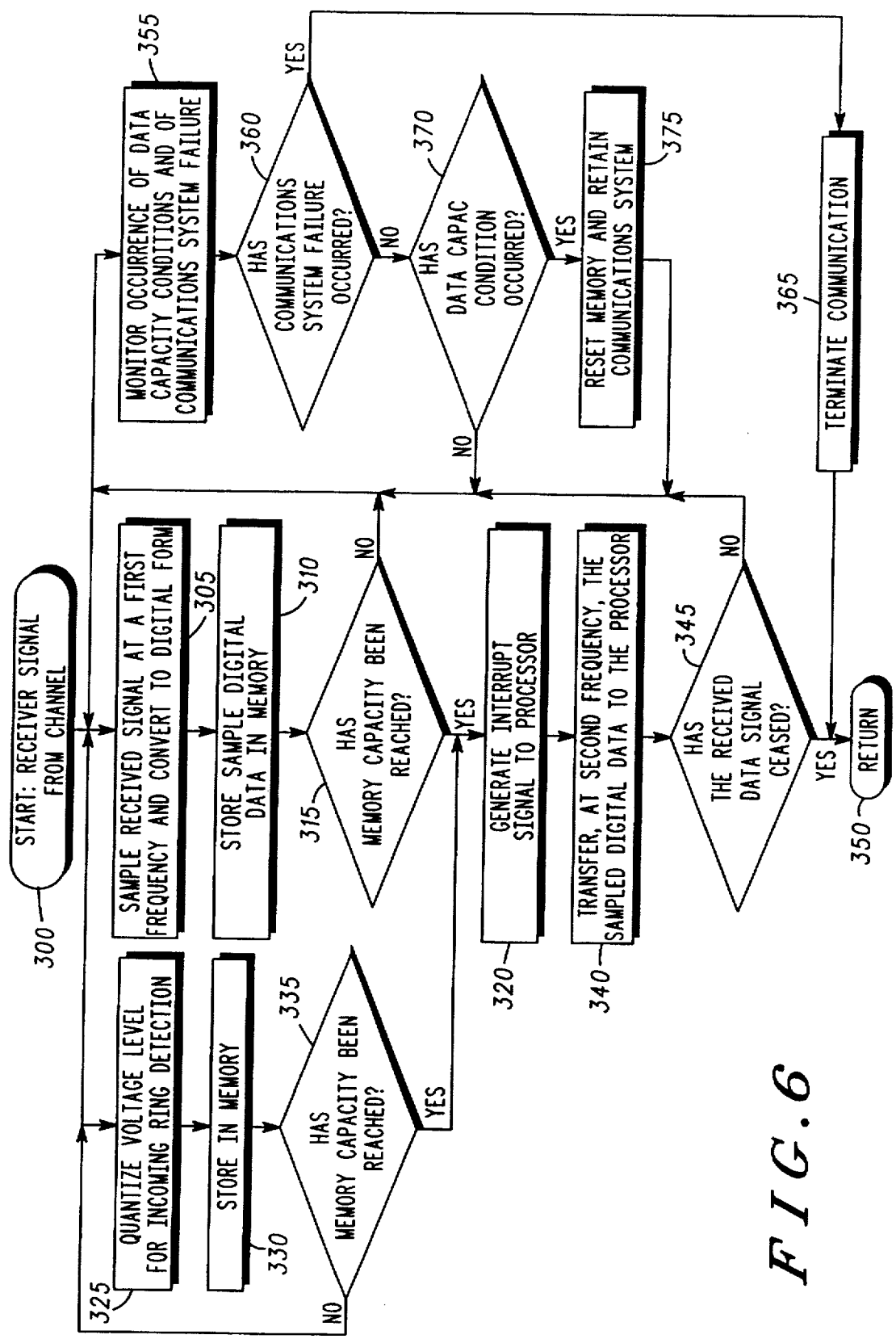
FIG. 6 is a flow diagram illustrating the receive data interface method in accordance with the present invention.

FIG. 6 is a flow diagram illustrating the receive data interface method in accordance with the present invention. The process begins with the received data signal, start step 300, analogous to the processing performed by the channel interface circuit 106 in FIG. 3. The received data signal is then periodically sampled at a first, determinate or predetermined frequency and converted to digital form, as sampled digital data, forming a sequence of received sampled data, step 305, analogous to the processing provided by the codec (or A/D converter) 108 in FIG. 3. The sequence of received, sampled digital data is then stored in memory, step 310, such as the receive sample FIFO 116 of FIG. 3. The method then determines whether the memory has reached a predetermined capacity, such as 18 samples, step 315, and if the memory capacity has been reached, an interrupt signal is generated and transmitted to the processor, step 320, as in the processing provided by status detector 136 and the interrupt generator 128 in FIG. 3. If the memory capacity has not been reached in step 315, the method repeats and returns to step 305 to sample and convert the received signal into digital form, and stores the received, sampled digital data in memory, step 310. During this process, the method may also quantize the received signal for detection of an incoming ring signal, step 325, and the quantized data is also stored in memory, step 330, in a manner analogous to the processing performed by the one bit quantizer 118 and the ring FIFO 112. The method determines if the incoming ring memory, such as the ring FIFO 112 has reached a predetermined capacity, step 335, and if so, an interrupt signal is also generated, step 320. If the incoming ring memory has not reached a predetermined capacity, the process repeats, returning to step 325. Proceeding from step 320 when an interrupt signal has been generated, the process transfers, at a second and usually indeterminate frequency, the sampled digital data or quantized incoming ring information, to the processor for processing, such as demodulation, decoding, equalization, error correction, and other modem operations or communications functions. The process determines if the incoming signal has ceased, i.e., the end of the incoming signal has been reached, such as a predetermined sequence of bits indicating the end of the transmission and that no more information will be received, step 345. If the end of the transmission has not been reached, namely, more information is being received, in step 345, the process repeats and returns to step 305. If the end of the transmission has been reached, such that more information is not being received, in step 345, the process ends, step 350.

Also as illustrated in FIG. 6 (and correspondingly in FIG. 7), during the receive data process in the preferred embodiment, various status detection processes are also occurring, analogous to the processing performed by the status detector 136 in FIG. 3. The process monitors for a communications system failure or other catastrophic event, and monitors for data capacity (overrun and underrun) conditions, step 355. If a communications system failure or other catastrophic event has occurred, step 360, the method terminates the communication, step 365, and ends the process, step 350. If a data capacity condition has occurred, or any other event which may cause a loss of sequence or synchronization, step 370, the process provides for resetting the memory and retraining the communications system, step 375, and returning to the receive data process, step 305.

Figure 7:
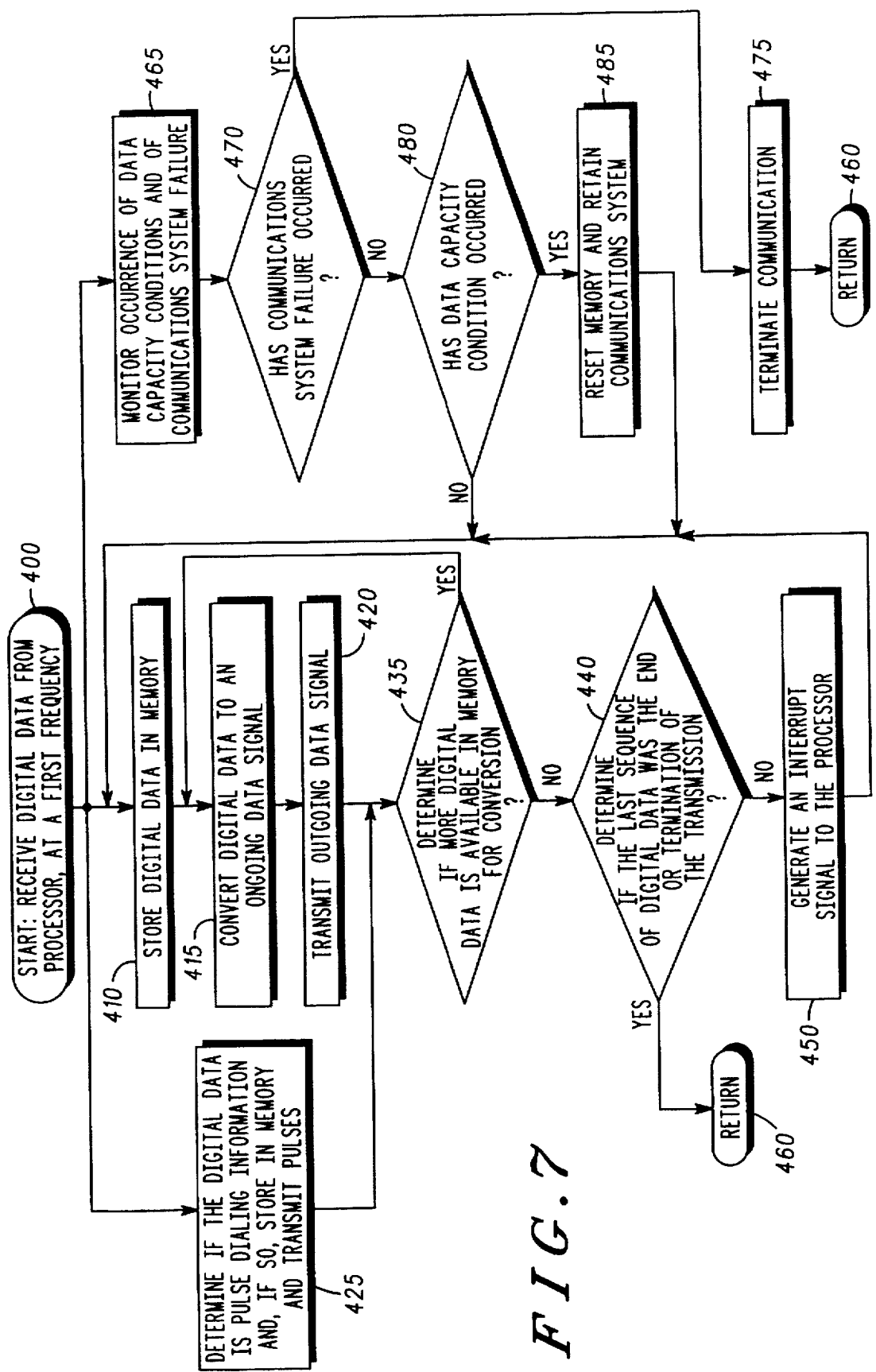
FIG. 7 is a flow diagram illustrating the transmit data interface method in accordance with the present invention.

FIG. 7 is a flow diagram illustrating the transmit data interface method in accordance with the present invention. The method begins with receiving a sequence of digital data from the processor, usually at an indeterminate or variable rate or frequency, start step 400. The sequence of digital data is stored in memory, step 410, such as in the transmit sample FIFO 114 in FIG. 3. The sequence of digital data is converted (usually at a determinate frequency) to an outgoing data signal, such as an analog signal, step 415, and transmitted on the channel, step 420, analogous to the processing performed by the codec (or A/D converter) 108 and the channel interface circuit 106 of FIG. 3. The process also determines if pulse dialing information has been received from the processor, and if so, the pulse dialing information is stored in memory and transmitted on the channel, step 425, as in the processing performed with the hook FIFO 110. The process continues with step 435, in which the method determines if more digital data is stored in memory and available for transmission on the channel. If more digital data is stored and available for transmission in step 435, the process repeats and returns to step 415, converting the sequence of digital data into an outgoing data signal for transmission. If more digital data is not stored and available for transmission in step 435, then the process determines if the last digital data received indicated an end of transmission, step 440. If the last information received from the processor did not indicate an end of the transmission in step 440, the method proceeds to generate an interrupt signal to the processor, step 450, and the process repeats, returning to step 400. If the last information received from the processor did indicate an end of the transmission in step 440, then the process ends, step 460.

As correspondingly illustrated in FIG. 6 for data reception, FIG. 7 also illustrates, in the preferred embodiment, various status detection processes occurring during the transmit data process, analogous to the processing performed by the status detector 136 in FIG. 3. The process monitors for a communications system failure or other catastrophic event, and monitors for data capacity conditions, step 465. If a communications system failure or other catastrophic event has occurred, step 470, the method terminates the communication, step 475, and ends the process, step 460. If a data capacity condition has occurred, or any other event which may cause a loss of sequence or synchronization, step 480, the process provides for resetting the memory and retraining the communications system, step 485, and returning to the transmit data process, step 400.

As mentioned above, the data reception and data transmission aspects of the invention may operate independently. Not illustrated in FIGS. 6 and 7, the data transmission and data reception functions may also operate in tandem or some other related fashion, such as simultaneously in a full-duplex modem operation. To summarize such dual operation, the present invention includes a method of interfacing between a processor and a communications channel for data transmission and reception, with the processor operable in data terminal equipment having a communications application program. The method comprises, first, (a) receiving a data signal from the communications channel to form a received data signal, step 300; (b) periodically sampling the received data signal at a first frequency to form a sequence of received sampled data, step 305; (c) storing the sequence of received sampled data in a memory, step 310; and (d) periodically transferring at a second frequency the received sampled data from the memory to the processor, step 340; and second, (e) periodically transferring at the second frequency a sequence of digital data from the processor to a memory, step 340; (f) storing the sequence of digital data in the memory, step 410; (g) periodically transferring at the first frequency the sequence of digital data to a codec to generate an outgoing data signal, step 415; (h) transmitting the outgoing data signal on the communications channel, step 420; and (i) generating an interrupt signal to the processor, steps 320 and 450. In addition, the method may also include step (j), receiving and detecting an incoming ring signal from the communications channel, including (1) quantizing a voltage level of the incoming ring signal received from the communications channel to form digital ring information, step 325; (2) storing the digital ring information in a memory, step 330; (3) periodically transferring at the second frequency the digital ring information from the memory to the processor in response to the interrupt signal, steps 320 and 340. The transmission aspect of the invention may also include step (k), detecting whether the sequence of digital data is pulse dialing information, and in the event that the sequence of digital data is pulse dialing information, transmitting corresponding dial pulses on the channel, step 425. The transmission and reception method may include step (l), repeating steps (a) through (d), and step (i), inclusive, until the received data signal has ceased; and step (m), repeating steps (e) through (i), inclusive, until a termination sequence of the digital data transferred from the processor has been transferred to memory. When both data reception and data transmission are to occur, moreover, then steps (a) through (d), inclusive, occur simultaneously with steps (e) through (i), inclusive. Lastly, the transmission and reception method may include step (n), detecting a data capacity condition and, upon such detection, generating a status signal to reset the memory and to institute retraining procedures for the communications system; and step (o) detecting a communications system failure and, upon such detection, generating a status signal to terminate a connection with the communications channel.

As indicated above, the interface apparatus and method of the present invention recognizes the data transmission rate and processing rate mismatch, and provides a mechanism for responding to a corresponding bottleneck-type problem. In responding to an interrupt signal indicating that data is needed for transmission, the processor may transmit for short term storage, to the transmit sample FIFO 114, at the higher processor rate or frequency, more data than may be currently transmitted at the typically lower data transmission rate. Correspondingly, incoming data received at the lower data transmission rate will have been stored, in the receive sample FIFO 116, and subsequently may be processed in its entirety by the processor at the higher or faster processor rate or frequency.

During this time, moreover, neither the processor nor the interface apparatus is required to delay or wait for the other to perform its functions, thereby optimizing overall performance. For example, during the time required for the receive sample FIFO 116 to be filled by incoming samples, the processor may be performing other applications functions. Correspondingly, for data transmission, the processor may rapidly fill the transmit sample FIFO 114, which then stores the information for transmission at the lower data transmission rate. While the data is being transmitted, the processor may also be performing other applications programs, and a bottleneck-type situation does not result from too little received data available for processing or too much processed data available for transmission. The apparatus and method of the present invention also provides for various mechanisms to recover from communications system failures, and to recover from various data capacity conditions or other data error conditions.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

We claim:

1. An interface apparatus for interfacing between a processor and a communications channel, the processor operable in data terminal equipment having a communications application program capable of performing modem functions of training, equalization, encoding, and decoding, the communications application program being responsive to interrupt signals from the interface apparatus the interface apparatus comprising:

a channel interface circuit coupleable to the communications channel to receive an incoming data signal and to transmit an outgoing data signal;

a memory;

a codec coupled to the memory and further coupled to the channel interface circuit to periodically sample the incoming data signal at a first determinate frequency to form a sequence of incoming sampled data and to transfer the sequence of incoming sampled data to the memory, and to receive a sequence of outgoing digital data from the memory and to convert the sequence of outgoing digital data to the outgoing data signal;

an interrupt signal generator responsive to data conditions in the memory to generate a first interrupt signal and to transmit the first interrupt signal to the processor, the first interrupt signal indicating one of a first and second data condition, the first condition being a presence in the memory of a first predetermined quantity of digital data for processing by the communications application program and the second condition being an absence of a second predetermined quantity of digital data stored in the memory for transmission on the channel, such that the communications application program can respond to the first condition by removing data from the memory to perform modem functions thereon and can respond to the second condition by writing data to the memory, the data having been processed by modem functions in the communications application program; and an electromechanical interface circuit coupled to the memory, to the interrupt signal generator, and to the processor for data transfer between the processor and the memory and for transmission of the first interrupt signal to the processor.

2. The interface apparatus of claim 1, further comprising:

a status detector coupled to the memory and to the interrupt signal generator, further coupled to the channel interface circuit, the status detector responsive to detect a communications system failure, wherein in response to a communications system failure a connection with the communications channel is terminated.

3. The interface apparatus of claim 1 wherein the interrupt signal generator is further responsive to generate and send to the processor a second interrupt signal to indicate a presence of an incoming ring signal on the communications channel.

4. The interface apparatus of claim 3, further comprising:
a one-bit quantizer coupled to the channel interface circuit for detection of an incoming ring signal.

5. The interface apparatus of claim 4, wherein the memory includes a ring FIFO for receiving incoming sampled data which is detected as an incoming ring signal.

6. The interface apparatus of claim 1, wherein the first interrupt signal is generated by the interrupt signal generator at a second indeterminate frequency which is different than the first frequency.

7. The interface apparatus of claim 1, wherein the memory includes a hook FIFO for storage of pulse dial information to be transmitted on the channel as an outgoing data signal.

8. The interface apparatus of claim 1, wherein the memory includes a FIFO to store outgoing digital data that has been processed by the modem functions of the communications application program and that is to be transmitted on the channel as an outgoing digital data signal.

9. The interface apparatus of claim 8 wherein the FIFO to store outgoing digital data is large enough to store at least 18 samples of outgoing digital data.

10. The interface apparatus of claim 1, wherein the memory includes a receive sample FIFO for storing incoming sampled data to eventually be processed by the modem functions in the communications application program.

11. The interface apparatus of claim 10 wherein the receive sample FIFO is large enough to store at least 18 samples of outgoing digital data.

12. The interface apparatus of claim 1 wherein the channel interface circuit is a data access arrangement.

13. The interface apparatus of claim 12 wherein the communications system is further operable for a modem function.

14. The interface apparatus of claim 12 wherein the communications system is further operable for a telephone answering function.

15. The interface apparatus of claim 12 wherein the communications system is further operable for a speech processing function.

16. The interface apparatus of claim 1 wherein the channel interface circuit is a digital interface circuit.

17. The interface apparatus of claim 16 wherein the communications system is further operable for a terminal adapter function.

18. A method of interfacing between a processor and a communications channel for data reception, the processor operable in data terminal equipment having a communications application program, capable of performing modem functions of training, equalization, encoding, and decoding, the communications application program being responsive to interrupt signals, the method comprising the steps of:

(a) receiving a data signal from the communications channel to form a received data signal;

(b) periodically sampling the received data signal at a first determinate frequency to form a sequence of received sampled data;

(c) storing the sequence of received sampled data in a memory;

(d) generating an interrupt signal to the processor to indicate the presence of received sampled data in the memory; and (e) periodically transferring at a second indeterminate frequency the received sampled data from the memory to the processor so that the communications application program executing thereon may process the received sampled data according to modem functions of the communications application program.

19. The method of claim 18, further comprising the steps of:

(f) receiving and detecting an incoming ring signal from the communications channel;

(g) informing the processor of the detected incoming ring signal so that the communications application program can retrieve corresponding retrieved sampled data from the memory and determine the validity of the ring signal therefrom.

20. The method of claim 19, wherein the detection of an incoming ring signal further comprises:

(f1) quantizing a voltage level of the incoming ring signal received from the communications channel to form digital ring information;

(f2) storing the digital ring information in a memory; and (f3) periodically transferring at the second frequency the digital ring information from the memory to the processor in response to the interrupt signal.

21. The method of claim 18, further comprising:

(g) repeating steps (a) through (e), inclusive, until the data signal has ceased to be received.

22. A method of interfacing between a processor and a communications channel for data transmission, the processor operable in data terminal equipment having a communications application program, capable of performing modem functions of training, equalization, encoding, and decoding, the communications application program being responsive to interrupt signals, the method comprising the steps of:

(a) periodically transferring at a first frequency a sequence of digital data from the processor to a memory, the digital data from the processor having been processed by a modem function of the communications application program executing on the processor;

(b) storing the sequence of digital data in the memory;

(c) periodically transferring at a second frequency the sequence of digital data to a codec to generate an outgoing data signal;

(d) transmitting the outgoing data signal on the communications channel; and (e) generating an interrupt signal to the processor to indicate that the memory is capable of having stored therein more digital data from the processor.

23. The method of claim 22, wherein step (d) further comprises:

(d1) generating off hook and dial signals;

(d2) storing the off hook and dial signals as digital information in memory; and (d3) transmitting the off hook and dial signals on the channel prior to transmitting the outgoing data signal.

24. The method of claim 22, further comprising:

(f) detecting whether the sequence of digital data is pulse dialing information, and in the event that the sequence of digital data is pulse dialing information, transmitting corresponding dial pulses on the communications channel.

25. The method of claim 22, further comprising:

(g) repeating steps (a) through (e), inclusive, until a termination sequence of the digital data transferred from the processor has been transferred to memory and transmitted as the outgoing data signal on the communications channel.

26. The method of claim 22, further comprising:
(h) detecting an occurrence of a data capacity condition and, upon such detection, generating a status signal to reset the memory and to institute retraining procedures for the communications system.

27. The method of claim 22, further comprising:
(i) detecting an occurrence of a communications system failure and, upon such detection, generating a status signal to terminate a connection with the communications channel.

28. The method of claim 22 wherein the first frequency is an indeterminate frequency.

29. The method of claim 22 wherein the second frequency is a determinate frequency.

30. The method of claim 22 wherein the generating an interrupt signal step (e) further comprises generating the interrupt signal to the processor when the memory has been depleted to a predetermined level of storage of digital data.

31. A method of interfacing between a processor and a communications channel for data transmission and reception, the processor operable in data terminal equipment having a communications application program, capable of performing modem functions of training, equalization, encoding, and decoding, the communications application program being responsive to interrupt signals, the method comprising the steps of:
(a) receiving a data signal from the communications channel to form a received data signal;
(b) periodically sampling the received data signal at a first frequency to form a sequence of received sampled data;
(c) storing the sequence of received sampled data in a memory;
(d) periodically transferring at a second frequency the received sampled data from the memory to the processor;
(e) periodically transferring at the second frequency a sequence of digital data from the processor to a memory;
(f) storing the sequence of digital data in the memory;
(g) periodically transferring at the first frequency the sequence of digital data to a codec to generate an outgoing data signal;
(h) transmitting the outgoing data signal on the communications channel; and
(i) generating an interrupt signal to the processor indicating one of a first and second data condition, the first condition being a presence in the memory of a first predetermined quantity of digital data for processing by the communications application program and the second condition being an absence of a second predetermined quantity of digital data stored in the memory for transmission on the channel, such that the communications application program can respond to the first condition by removing data from the memory to perform modem functions thereon and can respond to the second condition by writing data to the memory, the data having been processed by modem functions in the communications application program.

32. The method of claim 31, further comprising:
(j) receiving and detecting an incoming ring signal from the communications channel.

33. The method of claim 32, wherein the detection of an incoming ring signal step (j) further comprises:
(j1) quantizing a voltage level of the incoming ring signal received from the communications channel to form digital ring information;
(j2) storing the digital ring information in a memory;
(j3) periodically transferring at the second frequency the digital ring information from the memory to the processor in response to the interrupt signal.

34. The method of claim 31, further comprising:
(k) detecting whether the sequence of digital data is pulse dialing information, and in the event that the sequence of digital data is pulse dialing information, transmitting corresponding dial pulses on the channel.

35. The method of claim 31, further comprising:
(l) repeating steps (a) through (d), and step (i), inclusive, until the data signal has ceased to be received; and
(m) repeating steps (e) through (i), inclusive, until a termination sequence of the digital data transferred from the processor has been transferred to memory and transmitted as the outgoing data signal on the communications channel.

36. The method of claim 31, further comprising:
(n) detecting an occurrence of a data capacity condition and, upon such detection, generating a status signal to reset the memory and to institute retraining procedures for the communications system.

37. The method of claim 31, further comprising:
(o) detecting an occurrence of a communications system failure and, upon such detection, generating a status signal to terminate a connection with the communications channel.

38. The method of claim 31, wherein steps (a) through (d), inclusive, occur simultaneously with steps (e) through (i), inclusive.

39. The method of claim 31, wherein step (h) further comprises:
(h1) generating off hook and dial signals;
(h2) storing the off hook and dial signals as digital information in memory; and
(h3) transmitting the off hook and dial signals on the communications channel prior to transmitting the outgoing data signal.

40. The method of claim 31 wherein the first frequency is a determinate frequency.

41. The method of claim 31 wherein the second frequency is an indeterminate frequency.

42. The method of claim 31 wherein the generating an interrupt signal step (i) further comprises:
generating the interrupt signal to the processor when the memory has reached a predetermined capacity of storage of received sampled data.

43. The method of claim 31 wherein the generating an interrupt signal step (i) further comprises:
generating the interrupt signal to the processor when the memory has been depleted to a predetermined level of storage of digital data.

* * * * *